United States Patent

Nenyei et al.

[11] Patent Number: 5,841,110
[45] Date of Patent: Nov. 24, 1998

[54] METHOD AND APPARATUS FOR IMPROVED TEMPERATURE CONTROL IN RAPID THERMAL PROCESSING (RTP) SYSTEMS

[75] Inventors: Zsolt Nenyei, Blaustein; Heinrich Walk, Allmendingen; Michael Maurer, Ulm; Thomas Knarr, Langenau, all of Germany

[73] Assignee: Steag-Ast GmbH, Kirchheim, Germany

[21] Appl. No.: 920,614

[22] Filed: Aug. 27, 1997

[51] Int. Cl.$^6$ .................................................. B23K 10/00
[52] U.S. Cl. ................ 219/497; 219/502; 219/121.43; 374/121; 374/161
[58] Field of Search ...................................... 219/502, 497, 219/494, 501, 121.43, 121.44; 374/121, 123, 125, 126, 130, 161, 120, 139, 141, 142, 162

[56] References Cited

U.S. PATENT DOCUMENTS

| | | | |
|---|---|---|---|
| 4,854,724 | 8/1989 | Adams et al. | 374/5 |
| 5,118,200 | 6/1992 | Kirillov et al. | 374/120 |
| 5,354,323 | 10/1994 | Whitebook | 607/89 |
| 5,627,081 | 5/1997 | Tsvo et al. | 438/57 |
| 5,628,564 | 5/1997 | Nenyei et al. | 374/121 |
| 5,641,419 | 6/1997 | Vandenabeele | 219/497 |

*Primary Examiner*—Mark H. Paschall
*Attorney, Agent, or Firm*—R. T. Hodgson

[57] ABSTRACT

A method for Rapid Thermal Processing (RTP) is presented, wherein the broadband reflectivity of an object is measured, and the results of the measurement used by the RTP system to adjust the RTP system parameters used in processing the object.

11 Claims, 5 Drawing Sheets

METHOD AND APPARATUS FOR IMPROVED TEMPERATURE CONTROL IN RAPID THERMAL PROCESSING (RTP) SYSTEMS

FIELD OF THE INVENTION

The present invention relates to an apparatus and a method for measuring and controlling the temperature of an object heated in a Rapid Thermal Processing (RTP) system. More specifically, the present invention discloses a method and apparatus for measuring and controlling the temperature of an object if interference effects disturb the conventional pyrometric methods of temperature measurements. The present invention is particularly useful in the case of semiconductor wafers which have layers of material deposited on the back side of the wafer, and in the case of Rapid Thermal Chemical Vapor Deposition (RT-CVD). The starting point of the present invention is that an in situ or ex situ in line broadband reflectometer measurement of the wafer is integrated in the equipment and in the process flow. On the basis of the reflectometer measurement results the RTP system selects corresponding calibration file for the prior art wafer temperature measurement system, usually comprising a pyrometer, or an corresponding open loop heating file for determining the lamp power vs time needed for the wafer in process.

The present invention improves the repeatability of the prior art "emissivity independent" heating control methods. In case of large differences in wafer emissivity these methods have about ±10° C. error in temperature control. The present invention improves the situation to the requirement of the industry for a maximum ±2° C. error.

BACKGROUND OF THE INVENTION

The field of rapid thermal processing has been chiefly concerned with uniformly heating semiconductor wafers to a known temperature, and measuring and controlling the temperature time profile of the wafer for the various annealing, chemical reaction, and film growth techniques required by the various processes. To achieve uniformity of heating, the individual lamps of the heating systems have been separately controlled by the control system, and the reflector systems have been carefully designed to irradiate the wafer in a known pattern.

Optical pyrometric temperature measurements in RTP systems require the selection of a wavelength and an optical bandwidth of the measurement. This choice is made on the basis of the material parameters of the wafer, the reactor chamber, the reflectors, and the radiation sources (See for example U.S. Pat. No. 5,188,458 and DE 4012615C2)

The so called "Ripple Technique" (U.S. Pat. No. 5,154,512) is a special case of optical pyrometric measuring. The heating lamp power supply is modulated with a frequency of 5–120 Hz, and the infra-red light emission from the wafer is measured in a narrow band through a first optical fiber while light emission from the lamps is measured in the same narrow band infra-red region through a second optical fiber. The wafer temperature usually cannot change fast enough for the emitted radiation to follow the modulation frequency, while the lamp filaments and hence the lamp radiation can be modulated at the modulation frequency. The radiation measured with the first fiber can be used to determine the radiation reflected from the wafer since the variation in the radiation must be due to the reflected light from the lamps. The variation in light reflected is measured, and the reflection coefficient for the wafer is deduced. Once the reflection coefficient for the wafer is known for a particular wavelength, the emissivity of the wafer at that wavelength is known, and the unvarying part of the radiation collected by the first optical fiber due to the emission from the wafer can be used to calculate the temperature. This technique is, however, very sensitive to temperature and the arrangements for the necessary mechanical adjustments of the light fibers are very expensive.

Use of optical fibers and light pipes to collect the light does not change the principles of the measurements cited above.

The best prior art signal to background ratios that can be reached using monochromatic or narrow bandwidth pyrometric techniques is about 1000:1 (DE4012615C2), which allows good reproducibility of the temperature measurement. However, such monochromatic or narrow bandwidth pyrometric measurement can be very strongly influenced by layers of material of different indices of refraction on the surface of the object being measured, and the method is practically unusable if the measured wafer surface has optically thin layers of variable layer thickness deposited thereon. The reflection coefficient at any wavelength, and hence the emissivity (which is 1 minus the reflectivity) of the surface, varies enormously at the various layer thickness vary. For example, as one layer of silicon dioxide grows from 0.25 micron thickness to 0.5 micron thickness on a silicon wafer, the reflectivity for 1.5 micron light varies from a minimum of 6% to a maximum of 42%. In such cases, a pyrometer can only be used if the bandwidth of the measured radiation is broad enough that the constructive and destructive interferences within the measuring bandwidth compensate each other. In the case cited above, a wavelength of 3 micron light has a reflectivity maximum when the wavelength at 1.5 microns has a reflectivity minimum. A measurement band of from 1.5 to 3 microns, (or a measurement wavelength of 2.25±0.75 microns) would be preferable to compensate the variations in emissivity. In such a case, it can be shown (on conservation of energy grounds) that the broadband wavelength filter cannot filter out the radiation from the background, and the signal to background ration becomes very small.

Specifications for emissivity variations for RTP often mention only a range of the emissivity factor (e.g. 0,3–0,9) without wavelength or wavelength range definition. These specifications implicitly contain the wavelength of the control pyrometer which is sensitive to only a narrow band of infra-red wavelengths.

Emissivity measured only in a narrow band where the temperature measuring pyrometer measures, however, does not give a good account of the energy coupling of the radiation to the wafer. Coupling depends on the integral of the emissivity or absorptivity in the total wavelength range of the radiative energy transfer from the RTP system lamps. The lamp light incident on the wafer has a very much broader spectral width than the pyrometer sensitivity.

The coupling of a coated wafer is very different from that of an uncoated wafer. The uncoated wafer is to first order a "gray" body. In optics, a grey body has an emission or absorption spectrum where the emission or absorption constant does not change. A "black" body has emission constant is equal to 1, whereas the emission constant of a "grey" body is less than one. Since the emission or absorption coefficient is constant over a large wavelength rage, a single emissivity or absorption coefficient defines the light absorption and emission properties of a grey or black body. Different layer constructions result in a non "grey" body, and the emission and absorption coefficients may vary wildly throughout the spectral region of the lamp radiation. A broad band measurement of the emissivity or reflectivity can, however, be used to predict the coupling of the radiation to the wafer and thus to set the system parameters of RTP system so that uniform heating to the desired temperature results.

Front and backside couplings of production wafers are very different. The front side may have many layers of patterned "spots", each spot having different spectrally integrated reflectivity and emissivity. The backside of the wafer is generally spatially uniform, and the spectrally integrated backside emissivity is generally quite different from the spatially and spectrally averaged emissivity of the front side of the wafer.

In the case of a spectrally varying "Non-gray-body" emissivity, a monochromatic (or narrow spectral band width) pyrometer signal has little to do with temperature. On the one hand at a given temperature different wafers give different pyrometer signals. On the other hand in the case of a fixed heating power level the different coupling results in a different wafer temperature.

RELATED APPLICATIONS

Reactors based on the RTP principle often have the entire cross section of one end of the reactor chamber open during the wafer handling process. This construction has been established because the various wafer holders, guard rings, and gas distribution plates, which have significantly greater dimensions and may be thicker than the wafers, must also be introduced into the chamber and must be easily and quickly changed when the process is changed or when different wafer sizes, for example, are used. The reaction chamber dimensions are designed with these ancillary pieces in mind. U.S. Pat. No. 5,580,830, assigned to the assignee of the present invention, teaches the importance of the gas flow and the use of an aperture in the door to regulate gas flow and control impurities in the process chamber.

The importance of measuring the temperature of the wafer using a pyrometer of very broad spectral response is taught in U.S. Pat. No. 5,628,564, which is assigned to the assignee of the present invention.

The wafer to be heated in a conventional RTP system typically rests on a plurality of quartz pins which hold the wafer accurately parallel to the reflector walls of the system. Prior art systems have rested the wafer on an instrumented susceptor, typically a uniform silicon wafer. Copending patent application 08/537,409, assigned to the assignee of the present invention, teaches the importance succeptor plates separated from the wafer.

Rapid thermal processing of III–IV semiconductors has not been as successful as RTP of silicon. One reason for this is that the surface has a relatively high vapor pressure of, for example, arsenic (As) in the case of gallium arsenide (GaAs). The surface region becomes depleted of As, and the material quality suffers. Copending patent application 08/631,265, assigned to the assignee of the present invention, hereby incorporated by reference, supplies a method and apparatus for overcoming this problem.

A method of raising the emissivity of a lightly doped, relatively low temperature wafer by locally heating the wafer with a pulse of light is disclosed in copending application 08/632,364, which is assigned to the assignee of the present invention. The above identified U.S. patents and applications are hereby incorporated by reference.

SUMMARY OF THE INVENTION

According to this invention an off line, or an in line in situ or ex situ, broad band reflectivity measurement is combined with another energy transfer or heating control method in an RTP system. The RTP system has means for creating and storing different calibration files and/or means for creating and storing different "open loop" files which determine the power to be delivered to the lamps as a function of time. These files are in the form of "look-up" tables, but may be in the form of functions of one or more variables. In accordance with preselected ranges of the measured reflectivities the equipment selects automatically a corresponding calibration file or open loop heating file for the given wafer in process, and carries out the process using the stored time history or the stored values for calibration of the temperature measurement devices.

DETAILED DESCRIPTION OF THE INVENTION

Figure 1:
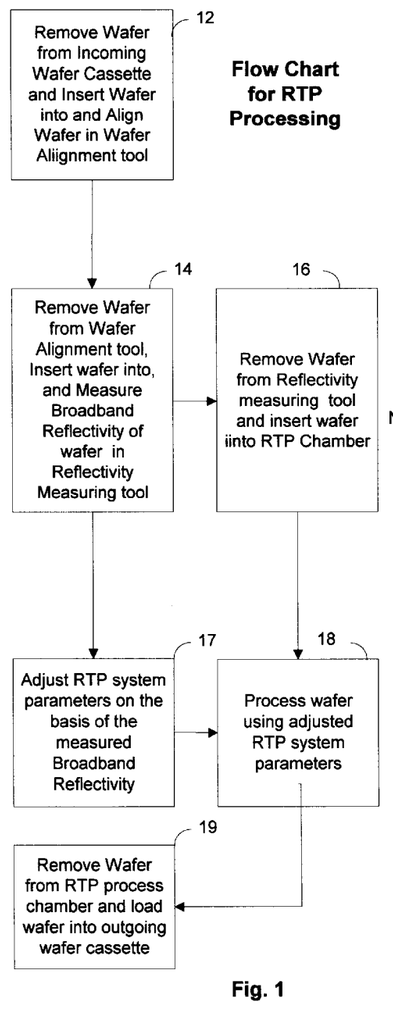
FIG. 1 is a flow chart of the most preferred method of the invention.

FIG. 1 shows a flow chart of the most preferred embodiment of the invention which is an in line ex-situ measurement of the broad band reflectivity. The cassette of wafers to be processed are loaded into a device from which a robot arm can withdraw a wafer at a time and transfer the wafer to a wafer aligning tool where the wafer is aligned in step 12. After the wafer has been aligned so that the flat on the wafer is in the correct orientation and the center of the wafer is correctly aligned, the robot arm picks up the wafer again and transfers the wafer to a broadband reflectivity measurement tool where the broadband reflectivity is measured in step 14. The spectrally integrated reflectivity may be measured in step 14, or the spectrally resolved reflectivity may optionally be measured using a spectrometer or other device as is known in the art. The robot arm removes the wafer from the reflectivity measurement tool, and inserts the wafer into the chamber of the RTP system in step 16. Independently of step 16, the system computer receives the results of the measurement in step 14, and adjusts a system parameter in step 17 so that the system may process the wafer in step 18. In step 19, the processed wafer is removed from RTP chamber and moved to a cassette for receiving the processed wafers.

Figure 2:
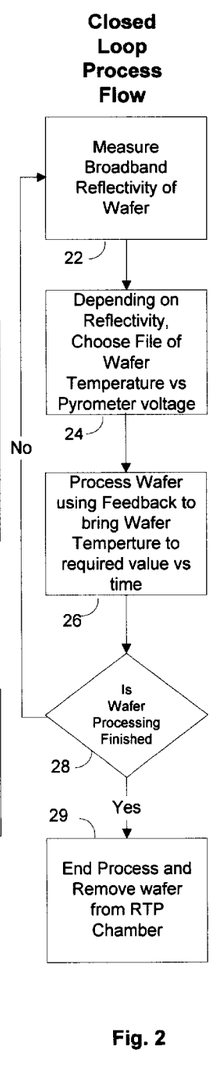
FIG. 2 is a flow chart for a closed loop process flow.
Figure 3:
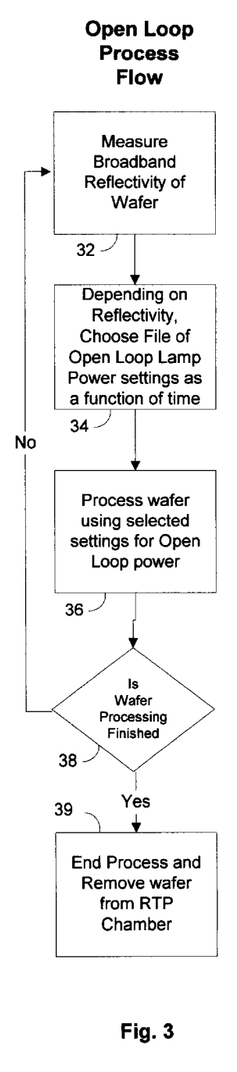
FIG. 3 is a flow chart for an open loop process flow.

FIG. 2 shows a flow chart of a "closed loop" process flow. The closed loop process is used when a pyrometer can be relied upon to give reproducible and reliable measurements related to the temperature of the object being measured, and is the normal process. When the temperature of the object is very low, however, or the object is partially transparent at the wavelength which the pyrometer measures, an open loop process such as shown in FIG. 3 must be used.

The broadband reflectivity of the wafer is measured in step 22, and the results of the measurement or measurements is used by the computer controlling the system to adjust the parameters of the system. In the case shown in FIG. 2, the computer chooses in step 24 one of eight files which give the wafer temperature as a function of the pyrometer reading. The wafer is then processed in the normal way in step 26, where the pyrometer reading is used to give the wafer temperature from the "look up" file chosen in step 24. The system then compares the wafer temperature with the temperature required by the process, and adjusts the lamp power up or down to bring the wafer temperature to the required temperature in the normal feedback loop process.

The broadband reflectivity may be measured only once, as in the ex situ set up detailed in FIG. 1, or an iterative set up may be used in an in situ measurement where the wafer reflectivity may be measured multiple times, and the system parameters changed as a result of the measurements. The decision step 28 decides whether the wafer processing has been finished, and if so the process is terminated in step 29. If the wafer processing has not been finished, the system returns to step 22 to remeasure the broadband reflectivity.

The in situ reflectivity measurement is very difficult to carry out if stray light from the heating lamps is intercepted by the optical system used to measure the reflectivity. In this case, the lamp power may be reduced for the few milliseconds necessary to measure the broad band reflectivity.

The prior art power controlled open loop processes eliminates the effect of any variations in monochromatic emissivity at the pyrometer wavelength, since the pyrometer is essentially not used to control the heating lamps. However, running the system in the open loop mode will give greatly varying wafer temperature due to coupling variations between wafers. The measurement of the broadband reflection coefficient of the wafer as shown in process step 32 of FIG. 3 can greatly reduce this variation. Once again, the system adjusts a parameter, in this case the system chooses a file of lamp power vs time in step 34 to run the RTP process outlined in step 36. Once again, an in situ measurement may be used to decide whether the wafer processing has been finished in step 38, and if not, return to step 32 to remeasure reflectivity. One option in this case is that the system may decide on the basis of the reflectivity to switch from an open loop to a closed loop control system.

HotLiner (TM) technology detailed in copending patent application 08/537,409, uses a light absorbing, thermally and optically stabile plate beneath the production wafer. The temperature of the plate can be measured accurately and the system can tolerate small to medium coupling variations on the wafer. In the case of larger coupling differences, an appropriate calibration file must be chosen, since the measured temperature of the plate will imply a different temperature for the wafer depending on the coupling or the broadband reflectivity measurement. In HotLiner (TM) technology the temperature of this plate is measured by conventional (monochromatic) pyrometry. The measured temperature is then fed back to the system to set the lamp power to produce the required temperature vs time profile of the HotLiner plate. The appropriate calibration file determines the temperature and/or the dual side heating in independent top and bottom heater bank control mode to control the mutual energy coupling between the wafer and the plate, so that the measured HotLiner (TM) temperature accurately controls the temperature of the production wafer.

The method "total reflectivity at pyrometer wavelength" shifts wafer emissivity at the pyrometer wavelength artificially upwards to the blackbody radiaton curve. Using a highly reflective sealed gold coating on the bottom part of a heating chamber beneath the wafer the effective emissivity of the wafer can be enhanced near to "1.0" in the infrared range. As a further improvement the coating may be designed for total reflection at pyrometer wavelength. The method is accurate in the case of small to medium monochromatic emissivity variations. In the case of lower monochromatic emissivity values (down to 0,3 at 0,9 $\mu$m), it is shown by Terrence F. Riley, Arun K. Nanda, G. Miner et al.: "Evaluation of Applied Materials Rapid Thermal Processor Using SEMATECH Methodologies for 0,25 $\mu$m Technology Thermal Applications" Part I., a presentation at the Rapid Thermal and Integrated Processing Conference. MRS Spring Meeting'96, San Fransisco Calif., that the effective emissivity can not approximate well the value of "one" and the error grows.

The method can tolerate greater coupling variations only in the case when the cause of the smaller emissivity is not a partial transparency. This is the case for bulk silicon materials and a pyrometer wavelength below the band gap energy (e.g. at 0,9 $\mu$mm for Si). It is also shown in the paper by Arun K. Nanda, Terrence J. Riley, G. Miner et al. entitled "Evaluation of Applied Materials Rapid Thermal Processor Using SEMATECH Metrologies for 0,25 $\mu$m Technology Thermal Applications" Part II. at the same conference that the major drawback of this method is that a small error in the assumption of a fully reflective surface will cause the effective emissivity to reduce significantly, resulting in larger temperature error. In the case that the reflector is cold and near the wafer backside, deposition from wafer out gassing may arise easily.

In accordance with the present invention we complete the existing "emissivity independent" methods with an in line broad band reflectivity measurement and select by software the proper calibration file or open loop heating file for the wafer in process. A preferred combination is a broad band reflectometry with power controlled open loop processing. Another preferred combination is a broad band reflectometry with HotLiner application or with wavevector selective pyrometry. In case of HotLiner application the temperature control of the HotLiner can be performed by any of the existing monochromatic or narrow band pyrometry.

Figure 4:
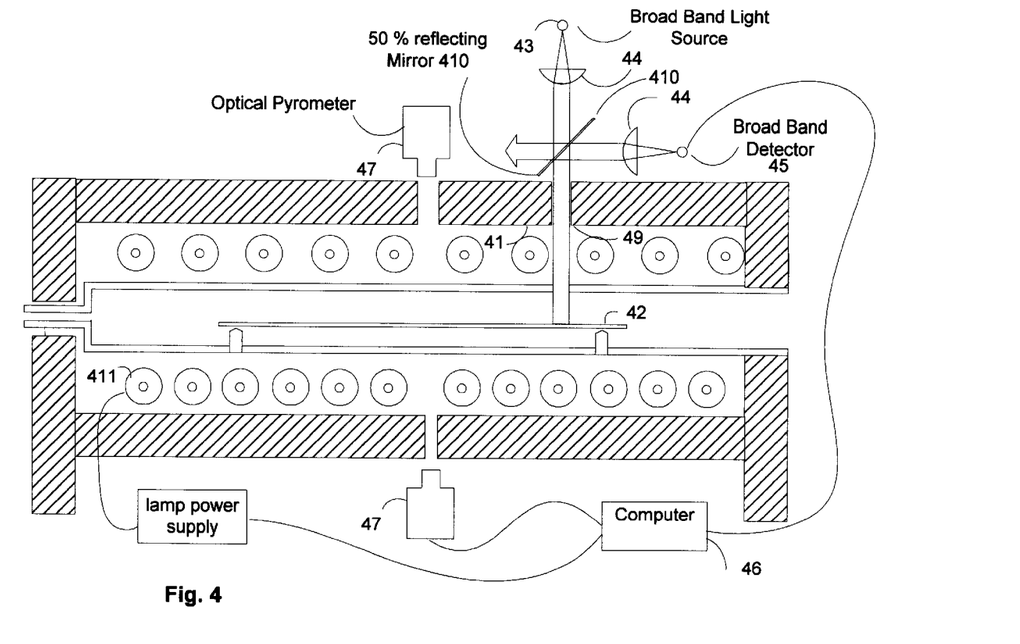
FIG. 4 is a diagram of an RTP system for in situ implementation of the invention.

FIG. 4 shows a sketch of a prior art RTP system with the addition of an in line in situ broadband reflection measurement system. A hole 49 is introduced into the reflecting wall 41 of the RTP system so that the wafer 42 can be seen by the measurement system. A broad band light source such as a tungsten lamp in a quartz envelope 43 is used to provide the light for the measurement. Lenses 44 are used to collimate and focus the light incident on and reflected from the wafer 42. A mirror 410 which reflects part of the light from the lamp 43 is used to deflect the light reflected from the wafer 42 to the broad band detector 45. The broad band light source 43 may be controlled by a computer 46, and the measurements of the reflected light by the broadband detector 45 can be used by the computer to adjust parameters for the RTP process. A number of optical pyrometers 47 are shown for use in a closed loop process. The computer 46 controls the lamp 411 power for the open loop process.

Figure 5:
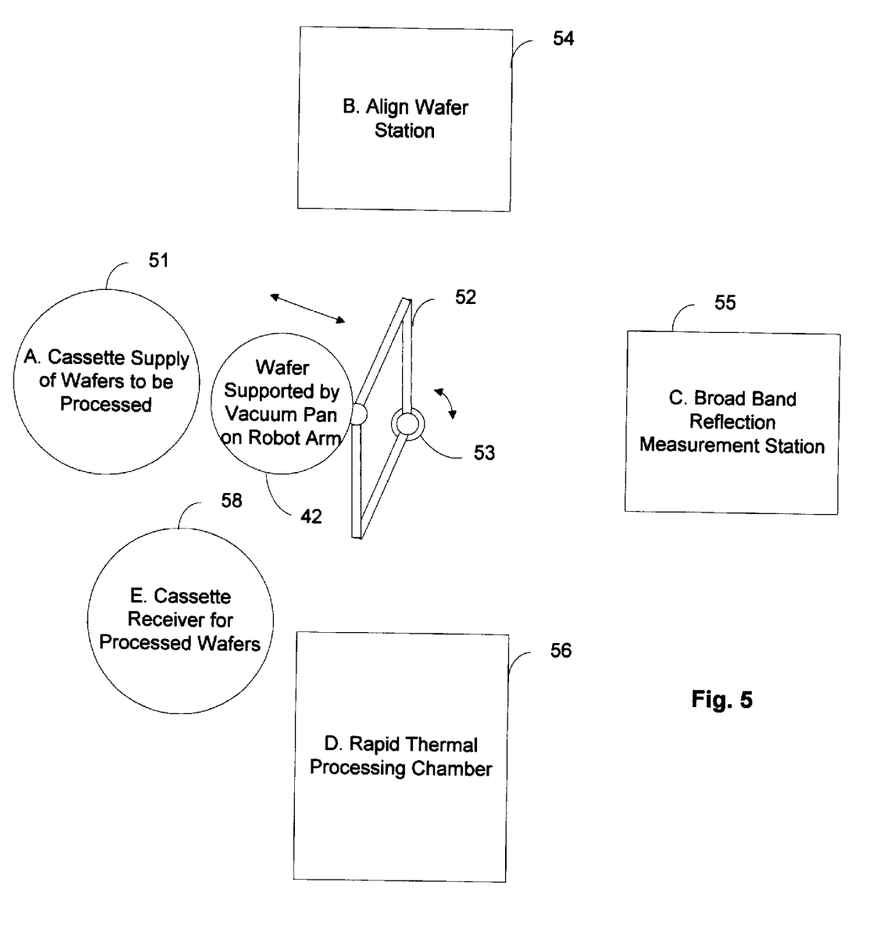
FIG. 5 is a plan view of equipment location for implementation of the invention.

FIG. 5 shows a floor plan of an RTP system. Cassettes with wafers to be processed are loaded into a cassette holder 51. A vacuum pan (not shown) on the end of a scissor like robot arm 52 lifts a wafer 42 from the cassette and withdraws the wafer 42 from the cassette holder 51. The robot arm 52 swivels around an axis 53 and inserts wafer 42 into an alignment tool 54. The alignment tool 54 rotates the wafer until the wafer flat is correctly aligned, and centers the wafer. The robot arm picks up the wafer 42 from the alignment tool 54 and moves it to the broad band reflectivity measuring tool 55. The wafer is now accurately aligned with respect to the robot arm. After the broadband reflectivity is measured, the robot arm removes the wafer from the broadband reflectivity measuring tool 55, and inserts the wafer 42 into the processing chamber 56 of the RTP system. After processing, the robot arm picks up the wafer 42 from the processing chamber 56 and moves it into a cassette contained in the receiver 58.

The inventors anticipate that the station for aligning 54 and the broadband reflection measurement system 55 may be combined in one tool to save floor space.

Figure 6:
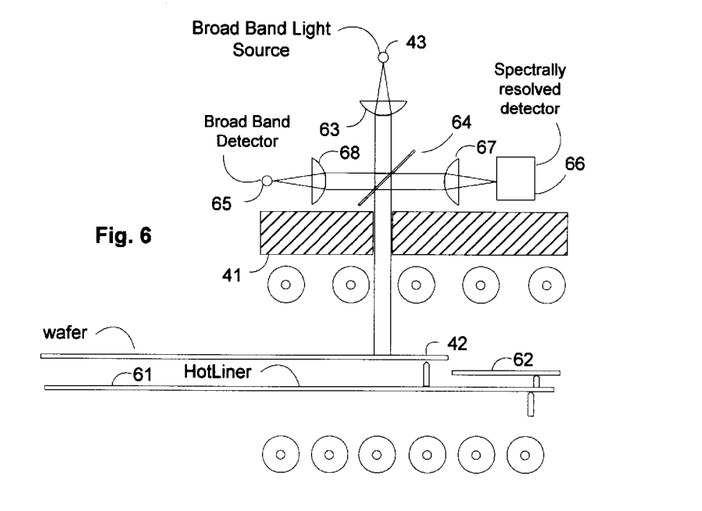
FIG. 6 is an expanded view of an in situ measurement method.

FIG. 6 shows a detail of an in situ broad band reflection measuring set up where a wafer 42 is held inside the chamber (not shown) of an RTP system above an auxiliary plate 61. A guard ring 62 is also shown. The radiation from a source of broad band radiation 43 is collimated by lens 63 into a parallel beam of radiation which impinges on a broad band reflecting mirror 64. The mirror may reflect 50% of the radiation from the light source 43 to a broad band detector 65. The signal from the broad band detector 65 gives the intensity of the light from source 43. About half of the collimated beam from the light source 43 and lens 63 continues in a straight line and reflects from the wafer 42. The reflected light reaches the mirror 64 and is reflected in part to a detector 66. In a preferred embodiment, the detector 66 is a bolometer. In another preferred embodiment, the detector 66 is a detector having spectral resolution capability such as a spectrometer and bolometer combination.

Common RTP equipment heats semiconductor wafers dominantly in the range of 0,4–4 micrometer wavelength. The broadband reflectometer should match this range as broadly as possible. In a preferred embodiment, the wafer reflectivity integrated over the spectral range and over the surface area of the wafer is used as an input parameter to select proper calibration or open loop files.

In our application the sensitivity range is about 0,4–3 micrometer. In a preferred embodiment the reflectometer has a thermoelectric sensor (bolometer). The bolometer has a completely flat spectral response to radiation throughout the relevant spectral region. The source of light in the reflectometer is a tungsten halogen lamp.

The sensor receives the direct and indirect reflected light through a quartz filter. A preferred reflectometer collects the reflected direct and indirect light by a spherical mirror in the lin line ex situ embodiment of the invention. This arrangement is suitable to measure reflectivity on one side of the wafer. The above mentioned optical components result in a sensitivity range of the measurement between 0,4–3 $\mu$m.

Lightly doped silicon wafers are above 1,1–1,3 $\mu$m are semi transparent. This is a source of error in measurement. To reduce or eliminate this error, a mirror can be used on the side of the wafer opposite to the light source. This mirror can also be a spherical one. In this case the absolute reflectivity can be measured. Another improvement possibility is the local free carrier generation at the measurement spot. This can be achieved by a strong focused signal of the measurement light itself or by local laser illumination in addition. A radiative preheating of the total wafer is also feasible.

EXPERIMENTAL RESULTS

We prepared 150 mm [100] "N" type 5–10 ohm-cm production quality Si wafers in four groups. One group was a reference without any coating. The other 3 groups were coated on the backside with the following layer combinations:

a.) 19 nm $SiO_2$+100 nm $Si_3N_4$
b.) 200 nm $SiO_2$+110 nm poly—Si (undoped)
c.) 580 nm $SiO_2$+160 nm poly—Si (undoped)

The frontside of the wafers were etched and prepared for oxidation. The backside layer combinations are known to have extremely different integral emissivity in our RTP equipment. The RTP equipment has tungsten halogen lamps and the heating chamber is gold coated. We have dual side heating.

Figure 7:
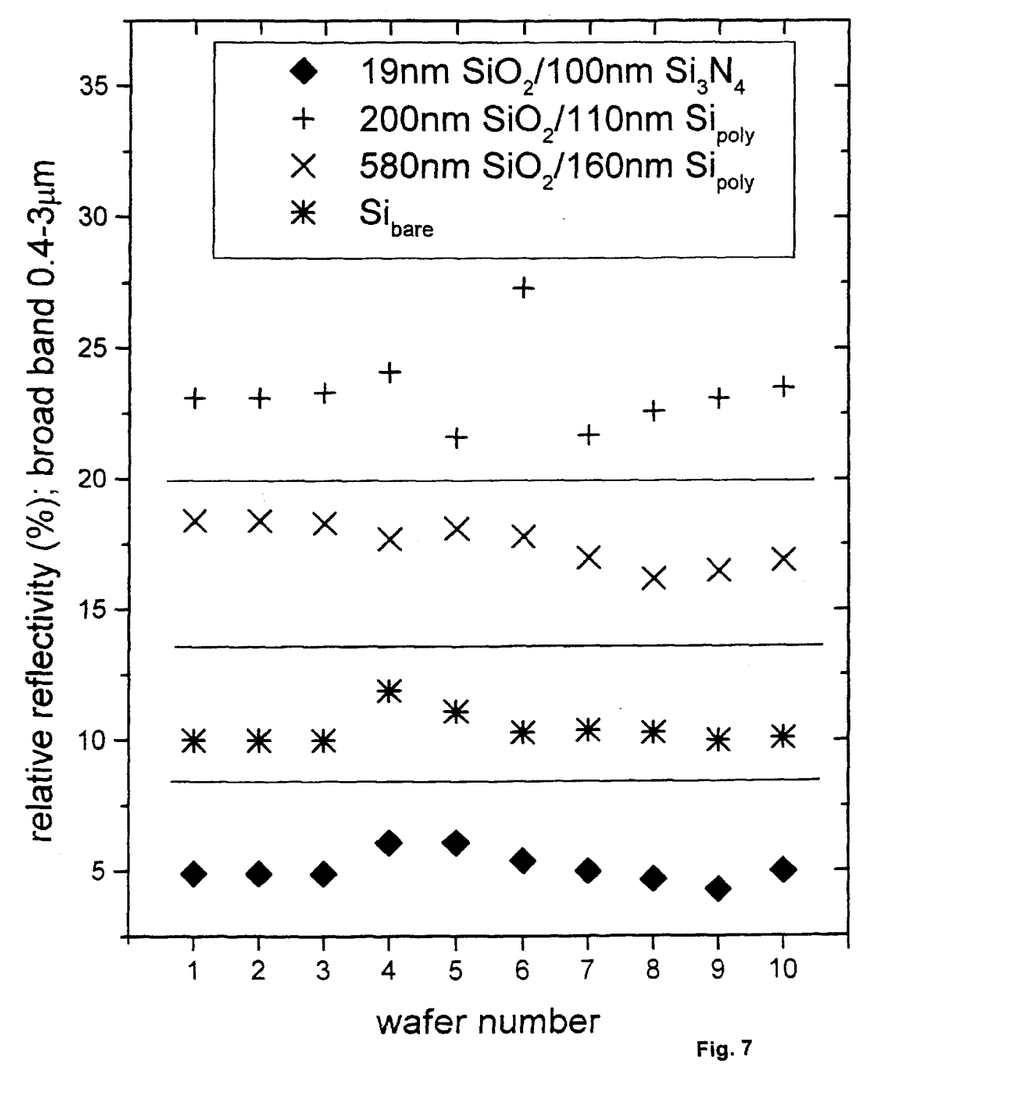
FIG. 7 shows the measured broadband reflectivity for wafers of various batches.

Representative measured broad band reflectivity values from wafers of each batch are plotted in FIG. 7.

We performed rapid thermal oxidation at 1130° C. for 45s in different processing modes. A HotLiner was used for all experiments. Using only one calibration or only one open loop heating file, the repeatability of the oxidation was in the range of about 10–11,2 nm. This range corresponds to a total temperature variation of 15° C.

Figure 8:
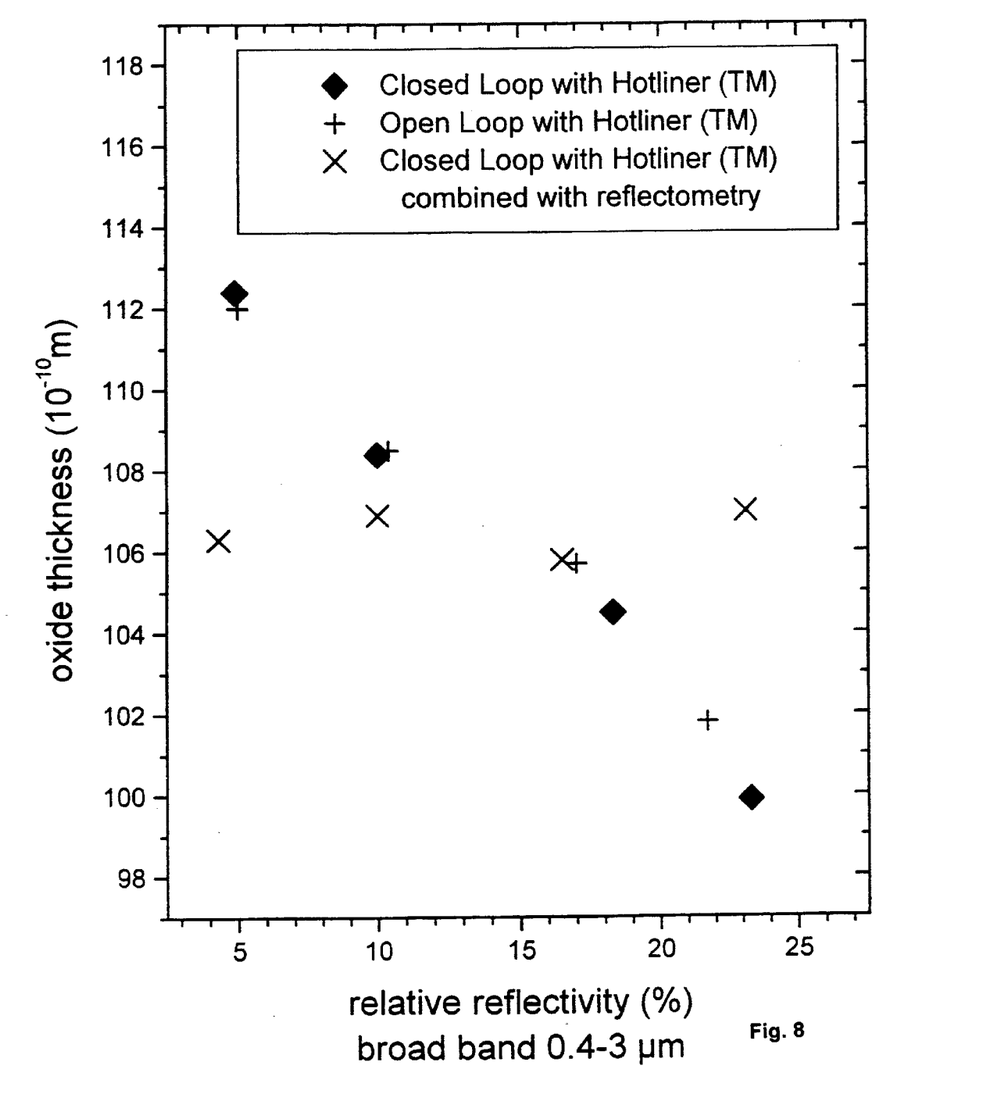
FIG. 8 shows the oxide thickness for the wafers of FIG. 7 treated according to various prior art processes and by the process of the invention.

When we used the results of the reflectivity measurement and selected the corresponding calibration file automatically, the repeatability of the oxidation was within 0,2 nm. This corresponds to a temperature variation of 3° C. The comparison of the oxidation results in case of the different heating methods is illustrated in FIG. 8.

Extensions of the invention controlling system parameters other than those enumerated in this disclosure on the basis of the measurement of broad band reflectivity are anticipated be the inventors.

We claim:

1. A method of rapid thermal processing (RTP) of an object using an RTP system, the object having a surface with a reflectivity, comprising;

measuring the—spectrally integrated—reflectivity of the surface of the object in a broad band of wavelengths; and adjusting a system parameter of the RTP system in response to the measured—spectrally integrated—reflectivity.

2. The method of claim 1, where the system parameter is an emissivity correction to an optical pyrometer, the optical pyrometer measuring the temperature of the object.

3. The method of claim 1, where the system parameter is a calibration file to calibrate a temperature measurement of the object by an optical pyrometer.

4. The method of claim 1, where the system parameter is file of lamp power vs time settings for an "open loop" heating cycle.

5. The method of claim 1, where the RTP system further comprises an auxiliary plate between the object and at least one heating lamp of the system, and the system parameter comprises a file of temperature of the object as a function of temperature of the auxiliary plate.

6. The method of claim 1, where the RTP system further comprises an auxiliary plate between the object and at least one heating lamp of the system, and the system parameter is a file of lamp power vs time settings for an "open loop" heating cycle.

7. The method of claim 1, where the reflectivity is measured in the process line as an ex-situ process.

8. The method of claim 1, where the reflectivity is measured in the process line as an in-situ process.

9. A method of rapid thermal processing (RTP) of an object using an RTP system, the object having a surface with a reflectivity, comprising the following steps in order;

a) introducing the object into a reaction chamber of an RTP system;

b) irradiating the object with radiation from radiation sources of the RTP system;

c) measuring the—spectrally integrated—reflectivity of the surface of the object in a broad band of wavelengths; and d) adjusting a system parameter of the RTP system in response to the measured reflectivity.

10. The method of claim 9 further comprising;

e) further irradiating the object with radiation from radiation sources of the RTP system.

11. The method of claim 10, where the irradiation from the irradiation sources is reduced during step c).

* * * * *